US012661716B2

(12) United States Patent (10) Patent No.: US 12,661,716 B2
Miyazawa (45) Date of Patent: Jun. 23, 2026

(54) BLADE

(71) Applicant: TUNGALOY CORPORATION, Fukushima (JP)

(72) Inventor: Shunsuke Miyazawa, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 350 days.

(21) Appl. No.: 18/396,547

(22) Filed: Dec. 26, 2023

(65) Prior Publication Data

US 2024/0207942 A1 Jun. 27, 2024

(30) Foreign Application Priority Data

Dec. 27, 2022 (JP) ................................. 2022-209376

(51) Int. Cl.
B23B 27/10 (2006.01)
(52) U.S. Cl.
CPC ........ B23B 27/10 (2013.01); *B23B 2250/121* (2022.01)
(58) Field of Classification Search
CPC ... B23B 27/10; B23B 27/00; B23B 2250/121; B23B 2250/12; B23B 2250/00; B23B 27/086; B23B 29/043; B23B 27/08
USPC .......................................................... 407/11
See application file for complete search history.

(56) References Cited

U.S. PATENT DOCUMENTS

| | | | | |
|---|---|---|---|---|
| 10,661,352 | B2 * | 5/2020 | Kaufmann | B23B 27/083 |
| 11,318,541 | B2 * | 5/2022 | Blabes | B23B 29/12 |
| 12,179,274 | B2 * | 12/2024 | Luik | B23B 29/043 |
| 2015/0209865 | A1 | 7/2015 | Malka et al. | |
| 2016/0339523 | A1 * | 11/2016 | Graf | B23B 27/10 |
| 2018/0243835 | A1 | 8/2018 | Malka et al. | |
| 2018/0326500 | A1 * | 11/2018 | Kaufmann | B23B 27/083 |
| 2021/0220921 | A1 * | 7/2021 | Luik | B23B 27/10 |
| 2021/0299757 | A1 | 9/2021 | Goeberl et al. | |
| 2021/0402485 | A1 | 12/2021 | Ishai et al. | |
| 2021/0402489 | A1 * | 12/2021 | Blabes | B23B 29/12 |
| 2024/0011526 | A1 * | 1/2024 | Frota de Souza Filho | B33Y 80/00 |

FOREIGN PATENT DOCUMENTS

| | | |
|---|---|---|
| JP | 2015-512794 A | 4/2015 |
| JP | 2018-030228 A | 3/2018 |
| JP | 2018-149654 A | 9/2018 |
| JP | 2020-104225 A | 7/2020 |

(Continued)

*Primary Examiner* — Lawrence Averick
(74) *Attorney, Agent, or Firm* — Studebaker Brackett PLLC

(57) ABSTRACT

A blade in which coolant can be efficiently supplied to a machining place with a reduced pressure loss is provided. In a blade 100 in which a cutting insert 13 is attached to an insert attachment portion 12 provided at a longitudinal end part of a blade body 11 formed in a long plate shape, the blade body 11 includes a supply inlet 51 opened at one side surface, a lower discharge port 53 and an upper discharge port 54 that are opened at an end face nearby the insert attachment portion 12, a lower coolant supply path 55 connecting the supply inlet 51 to the lower discharge port 53, and an upper coolant supply path 56 connecting the supply inlet 51 to the upper discharge port 54, and the lower coolant supply path 55 and the upper coolant supply path 56 each have a curved shape in a side view.

7 Claims, 10 Drawing Sheets

(56)     References Cited

FOREIGN PATENT DOCUMENTS

| JP | 2020-520816 A | 7/2020 |
| JP | 2020-163526 A | 10/2020 |
| JP | 2022-041951 A | 3/2022 |

* cited by examiner

BLADE

BACKGROUND OF THE INVENTION

Field of the Invention

The present invention relates to a blade.

Description of the Related Art

Japanese Patent Laid-Open No. 2020-104225 discloses that a bite in which a cutting insert is attached to a bite body is held by a tool block, the tool block is attached to a cutting tool table of a working machine such as a lathe, and grooving fabrication and cut-off fabrication of a machining target material being rotated are performed with a cutting blade of the cutting insert.

However, in a case in which a machining target material is fabricated by long protrusion with the cutting blade of the cutting insert, it is difficult to directly cool the cutting blade of the cutting insert by coolant from the outside.

Thus, Japanese Translation of PCT International Application Publication No. 2015-512794 and Japanese Patent Laid-Open No. 2018-30228 each discloses development of a blade that directly cools a cutting blade by supplying coolant to a blade flow path provided inside the blade and discharging the coolant through a blade exit opening positioned at a machining part.

The blade flow path of the blade disclosed in Japanese Translation of PCT International Application Publication No. 2015-512794 and Japanese Patent Laid-Open No. 2018-30228 are typically formed straight by machining fabrication with a drill.

Thus, in a case of providing a coolant supply path 4 in which a plurality of straight flow paths 4a are formed from one supply inlet 1 by drilling to bifurcate coolant into discharge ports 2 and 3 as illustrated in FIG. 13, bifurcation parts 5a and bent parts 5b are formed where the flow paths 4a intersect each other. Such bifurcation parts 5a and bent parts 5b at intersections of the coolant supply path 4 have shapes that are likely to cause flaking of the flow of the coolant and generate a pressure loss. Furthermore, with such a coolant supply path 4 constituted by the straight flow paths 4a, the coolant discharged from the discharge ports 2 and 3 is diffused as mist, which makes it difficult to efficiently supply the coolant to a place where machining is provided by a cutting blade 8 of a cutting insert 7 attached to an insert attachment portion 6.

The present invention is made in view of the above-described problems and intended to provide a blade in which coolant can be efficiently supplied to a machining place with a reduced pressure loss.

SUMMARY OF THE INVENTION

A blade of the present invention for achieving the above-described intention is a blade in which a cutting insert is attached to an insert attachment portion provided at a longitudinal end part of a blade body formed in a long plate shape, wherein the blade body includes
    a supply inlet opened at one side surface,
    a plurality of discharge ports opened at an end face nearby the insert attachment portion, and
    a plurality of coolant supply paths connecting the supply inlet to the plurality of discharge ports, and the coolant supply paths each have a curved shape in a side view.

According to the blade with this configuration, coolant supplied through the supply inlet can be discharged through the plurality of coolant supply paths from the plurality of discharge ports opened at the end face nearby the insert attachment portion. Accordingly, a machining place of an object fabricated by the cutting insert attached to the insert attachment portion can be cooled and lubricated with the coolant.

Since the coolant supply paths through which the coolant is guided to the discharge ports each have a curved shape, a pressure loss of the flowing coolant can be reduced as compared to a case of coolant supply paths that are straight flow paths bifurcated from the supply inlet and connected to a plurality of discharge ports. Accordingly, it is possible to efficiently supply the coolant to a machining place and efficiently cool and lubricate the machining place.

In the blade of the present invention,
    the coolant supply paths each have a cross-sectional area that gradually decreases from the supply inlet toward a corresponding one of the discharge ports.

According to the blade with this configuration, the cross-sectional area of each coolant supply path gradually decreases from the supply inlet toward the corresponding discharge port. Thus, the flow speed of the coolant flowing through the coolant supply path can be increased from the supply inlet toward the discharge port. Accordingly, it is possible to more efficiently supply the coolant to a machining place and efficiently cool and lubricate the machining place, thereby contributing to reduction of abrasion of the cutting insert.

In the blade of the present invention,
    the insert attachment portion is made of a slit having a plurality of support surfaces that sandwich and support the cutting insert to be fitted, and
    a distance from each of the coolant supply paths to a rear end part of the slit in a direction orthogonal to long sides of the blade body is longer than a distance from the coolant supply path to a corresponding one of the support surfaces.

According to the blade with this configuration, the second moment of area between the slit and each coolant supply path in the blade body can be increased. Accordingly, plastic deformation around the slit is reduced, which leads to lifetime extension.

In the blade of the present invention, a sectional shape of each of the coolant supply paths on a side closer to a corresponding one of the discharge ports is an elliptical shape or long hole shape that is long in a plane direction of the blade body, and an aspect ratio of the coolant supply path on the side closer to the discharge port is smaller than an aspect ratio of the coolant supply path on a side closer to the supply inlet.

According to the blade with this configuration, the sectional shape of each coolant supply path on the side closer to the corresponding discharge port is an elliptical shape or long hole shape that is long in the plane direction of the blade body. Thus, even when the thickness of the blade body is small, it is possible to ensure sufficient cross-sectional area of each coolant supply path on the discharge port side and smoothly discharge the coolant from the discharge port, thereby reducing scattering of the coolant. Moreover, the aspect ratio of each coolant supply path on the discharge port side is smaller than that on the supply inlet side. Accordingly, the flow speed of the coolant discharged from the discharge port is increased.

In the blade of the present invention, the blade body includes a chamber in which coolant supplied to the supply inlet is accumulated at a bifurcation place where the plurality of coolant supply paths are bifurcated from the supply inlet.

According to the blade with this configuration, the coolant supplied to the supply inlet is temporarily accumulated in the chamber, and thus the flow speed of the coolant is decreased before the coolant is fed to each coolant supply path. Accordingly, a bifurcation loss of the coolant fed to the coolant supply path is reduced.

In the blade of the present invention, a fillet portion having a circular arc shape in a sectional view is formed at a place where the chamber is connected to the coolant supply paths.

According to the blade with this configuration, an entrance loss of the coolant when the coolant flows from the chamber to each coolant supply path is reduced.

According to a blade of the present invention, coolant can be efficiently supplied to a machining place with a reduced pressure loss.

BRIEF DESCRIPTION OF THE DRAWINGS

FIG. 3 is a side view of the blade according to the present embodiment;

FIG. 13 is a side view of part of a blade including straight blade flow paths.

DETAILED DESCRIPTION OF THE PREFERRED EMBODIMENTS

An embodiment of the present invention will be described below in detail with reference to the accompanying drawings.

Figure 1:
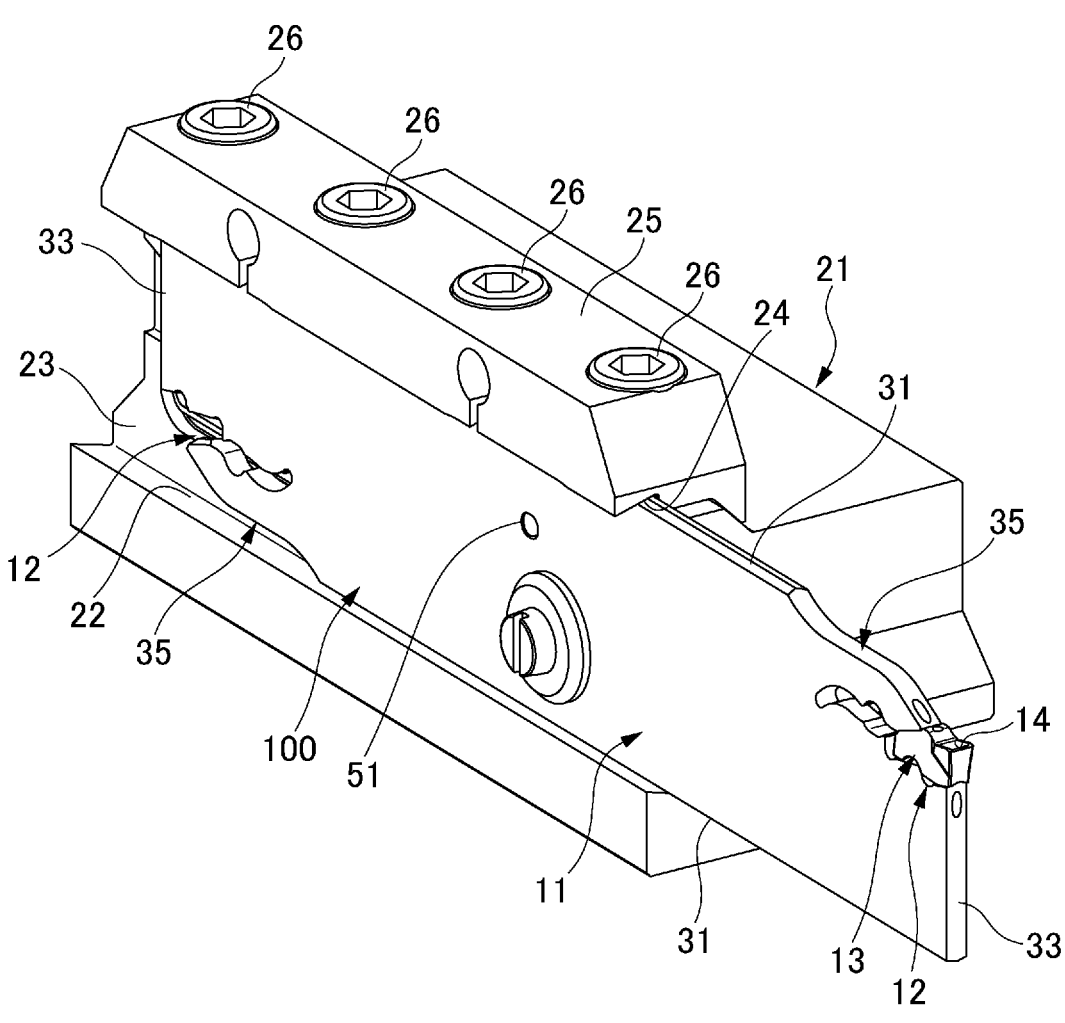
FIG. 1 is a perspective view of a blade according to the present embodiment when mounted on a tool block.

FIG. 1 is a perspective view of a blade according to the present embodiment when mounted on a tool block.

As illustrated in FIG. 1, a blade 100 according to the present embodiment includes a blade body 11 formed in a long plate shape. The blade body 11 includes an insert attachment portion 12 at each end part in its longitudinal direction, and a cutting insert 13 is attached to the insert attachment portion 12.

The blade 100 is fixed to a tool block 21 when used. The tool block 21 has a lower restriction surface 22 and a contact surface 23. A clamp member 25 having an upper restriction surface 24 is fixed to an upper part of the tool block 21 by a plurality of bolts 26.

The blade 100 is disposed in the tool block 21 in a state in which the blade 100 is placed on the lower restriction surface 22 of the tool block 21 and aligned with the contact surface 23. In this state, the blade 100 is pressed by the clamp member 25 fastened to the tool block 21 by the bolts 26. Accordingly, the blade 100 is fixed to the tool block 21 in a state in which the blade 100 is sandwiched between the lower restriction surface 22 and the upper restriction surface 24 of the clamp member 25.

The tool block 21 to which the blade 100 is fixed is mounted on a cutting tool table of a working machine such as a lathe. Then, for example, grooving fabrication and cut-off fabrication of a machining target material being rotated are performed with a blade tip 14 of the cutting insert 13 attached to the blade body 11 of the blade 100.

The blade 100 will be described below.

Figure 2:
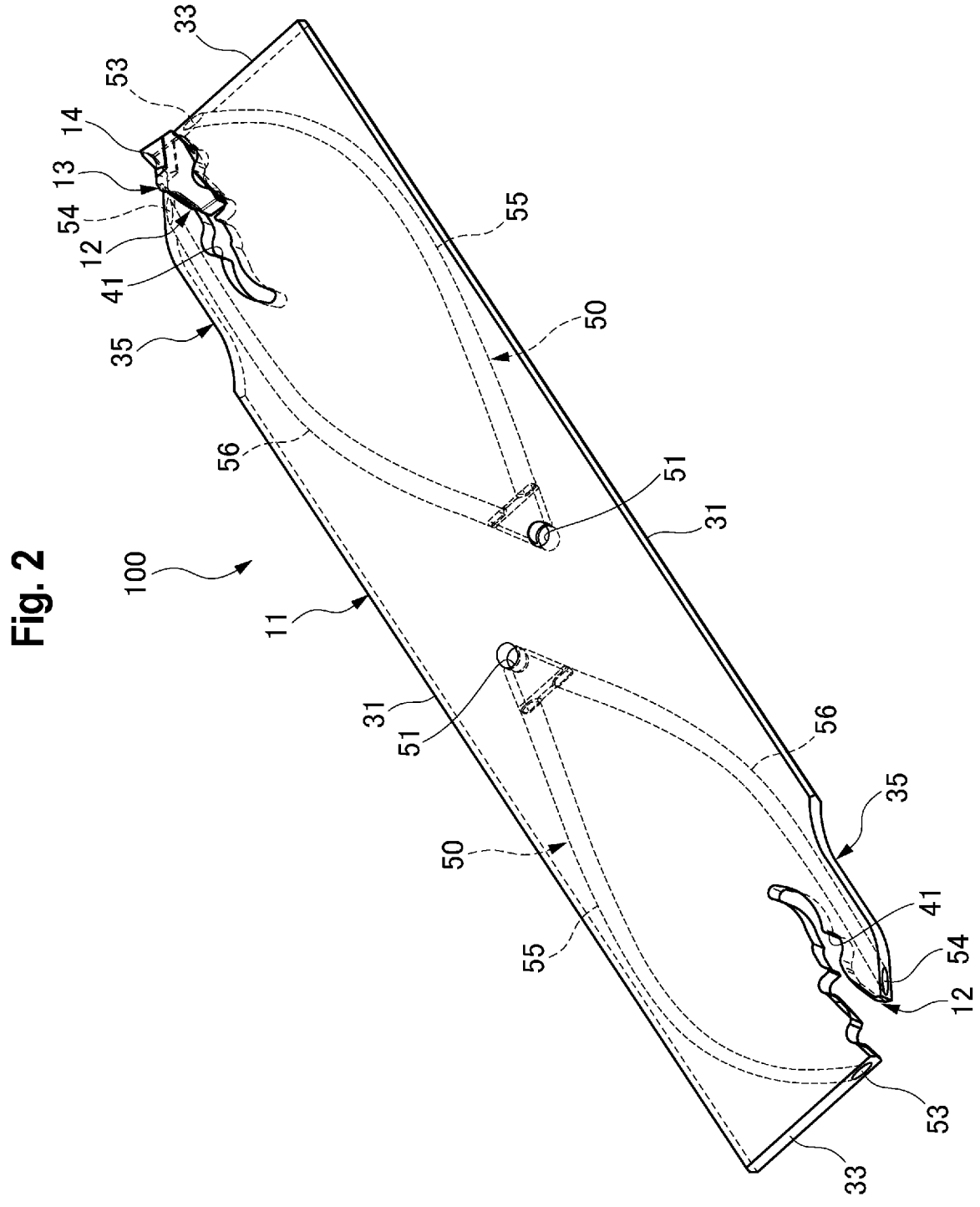
FIG. 2 is a perspective view of the blade according to the present embodiment.
Figure 3:
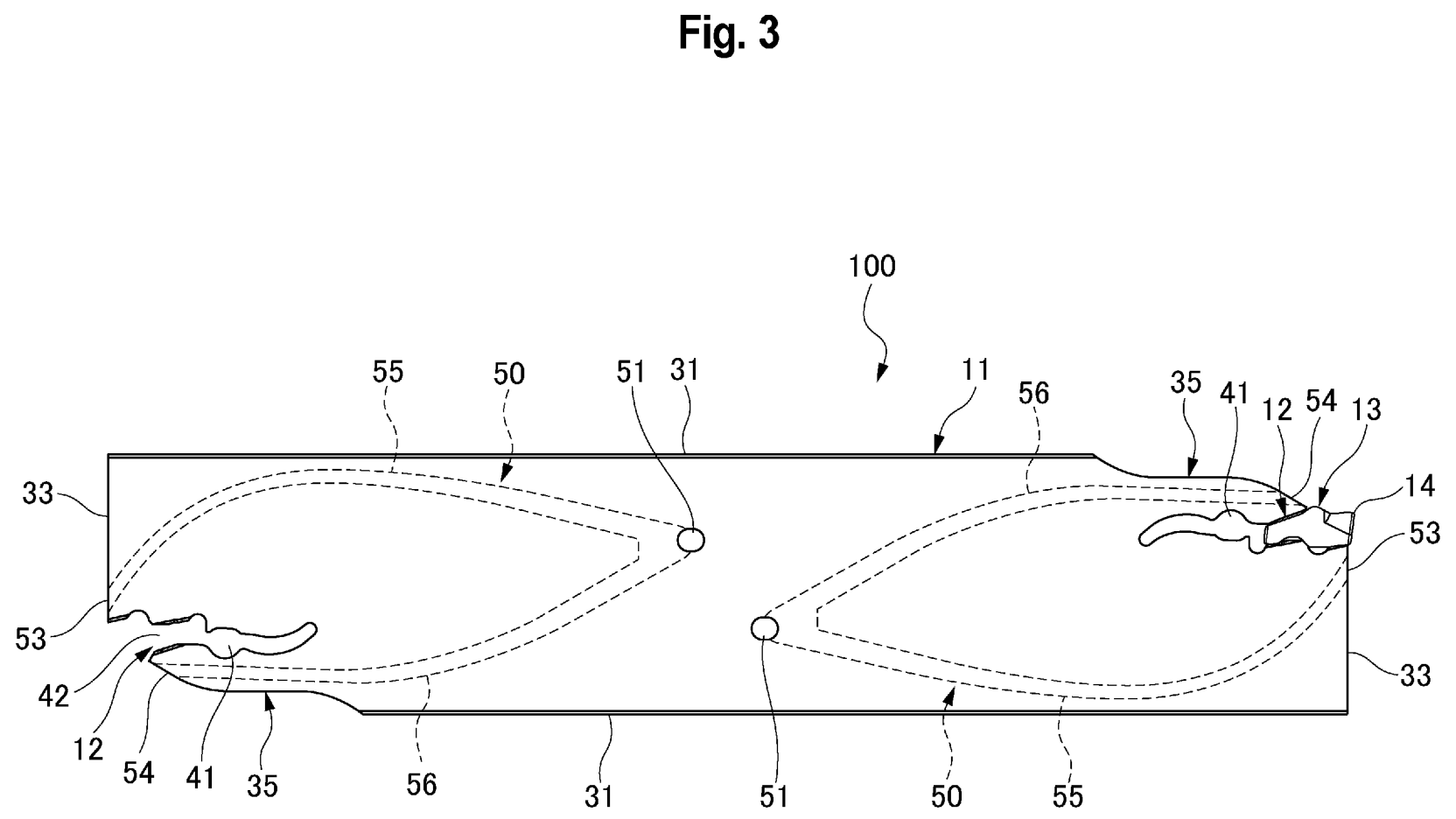

FIG. 2 is a perspective view of the blade according to the present embodiment. FIG. 3 is a side view of the blade according to the present embodiment.

As illustrated in FIGS. 2 and 3, the blade body 11 included in the blade 100 is formed in a rectangular plate shape having a pair of long sides 31 and a pair of short sides 33. The blade body 11 is formed of a metallic material such as a steel material. The material of the blade body 11 is preferably, for example, an alloy-tool-steel steel material (SKS5) that is elastic and unlikely to be plastically deformed.

The blade 100 is shaped by, for example, a metal powder sintering 3D printer configured to three-dimensionally shape a shaping target by using metal powder. Examples of shaping methods with a metal powder sintering 3D printer include powder bed fusion, electron beam melting (EBM) of melting powder by using an electron beam, and selective laser melting (SLM) of melting powder by using a laser beam.

In the blade body 11, the insert attachment portions 12 to each of which the cutting insert 13 is attached are formed at opposing corners at both ends. With this configuration, the blade body 11 is provided with insert holding portions 35 including the insert attachment portions 12 on both end sides. Accordingly, the blade 100 is a both-side holding blade, the blade body 11 of which can be fixed to the tool block 21 with its orientation inverted so that machining can be performed with the cutting insert 13 attached to the insert attachment portion 12 of any one of the insert holding portions 35.

Figure 4:
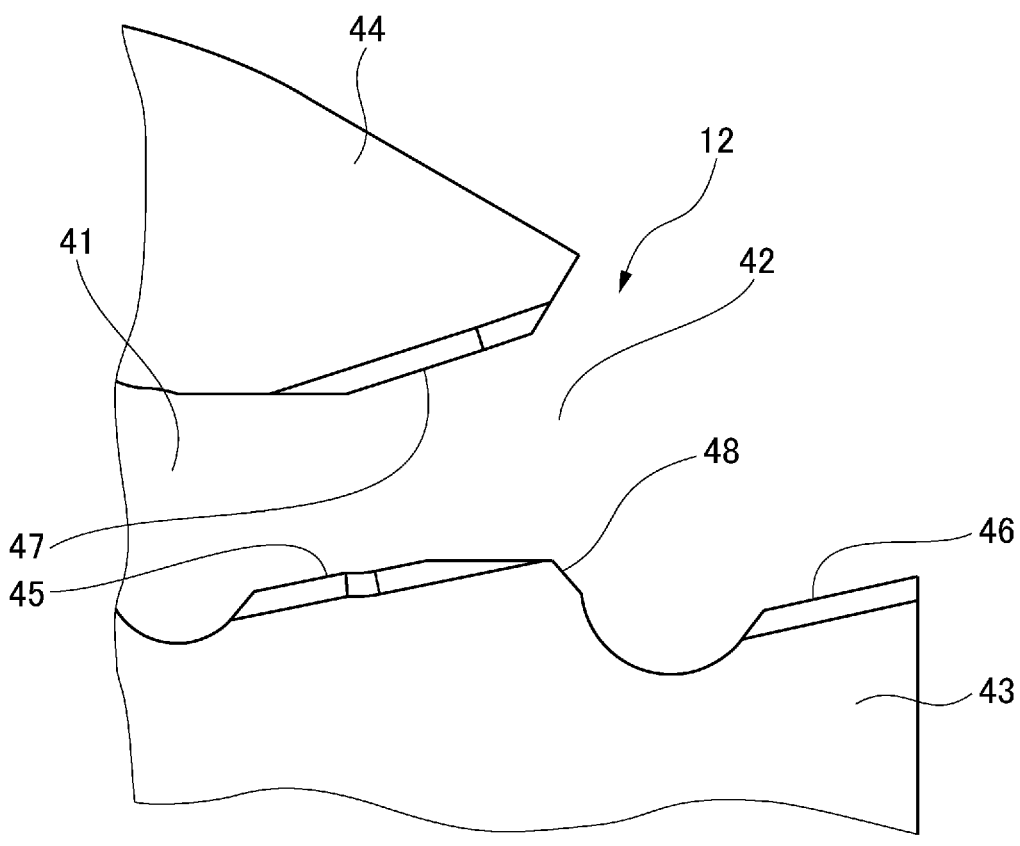
FIG. 4 is a side view of an insert attachment portion of a blade body.

FIG. 4 is a side view of each insert attachment portion of the blade body.

As illustrated in FIG. 4, each insert attachment portion 12 formed at a corner of the blade body 11 is made of a slit 41 that is opened at the corresponding short side 33 and in which the cutting insert 13 is fitted and held.

An insert pocket 42 is provided on the opened side of the slit 41, and the cutting insert 13 is fitted to the insert pocket 42. The lower side and upper sides of the slit 41 when the insert attachment portion 12 is disposed on the upper side are referred to as a blade lower portion 43 and a blade upper portion 44, respectively, of the blade body 11.

The insert pocket 42 of the slit 41 has insert lower support surfaces (support surfaces) 45 and 46 at the blade lower portion 43 and has an insert upper support surface (support surface) 47 at the blade upper portion 44. The insert pocket 42 also has an insert longitudinal support surface (support surface) 48 between the insert lower support surfaces 45 and 46.

The cutting insert 13 fitted to the insert pocket 42 is sandwiched and held by the lower support surfaces 45 and 46 and the upper support surface 47. The cutting insert 13 fitted to the insert pocket 42 is subjected to positioning in the depth direction of the slit 41 when contacting the insert longitudinal support surface 48.

Figure 5:
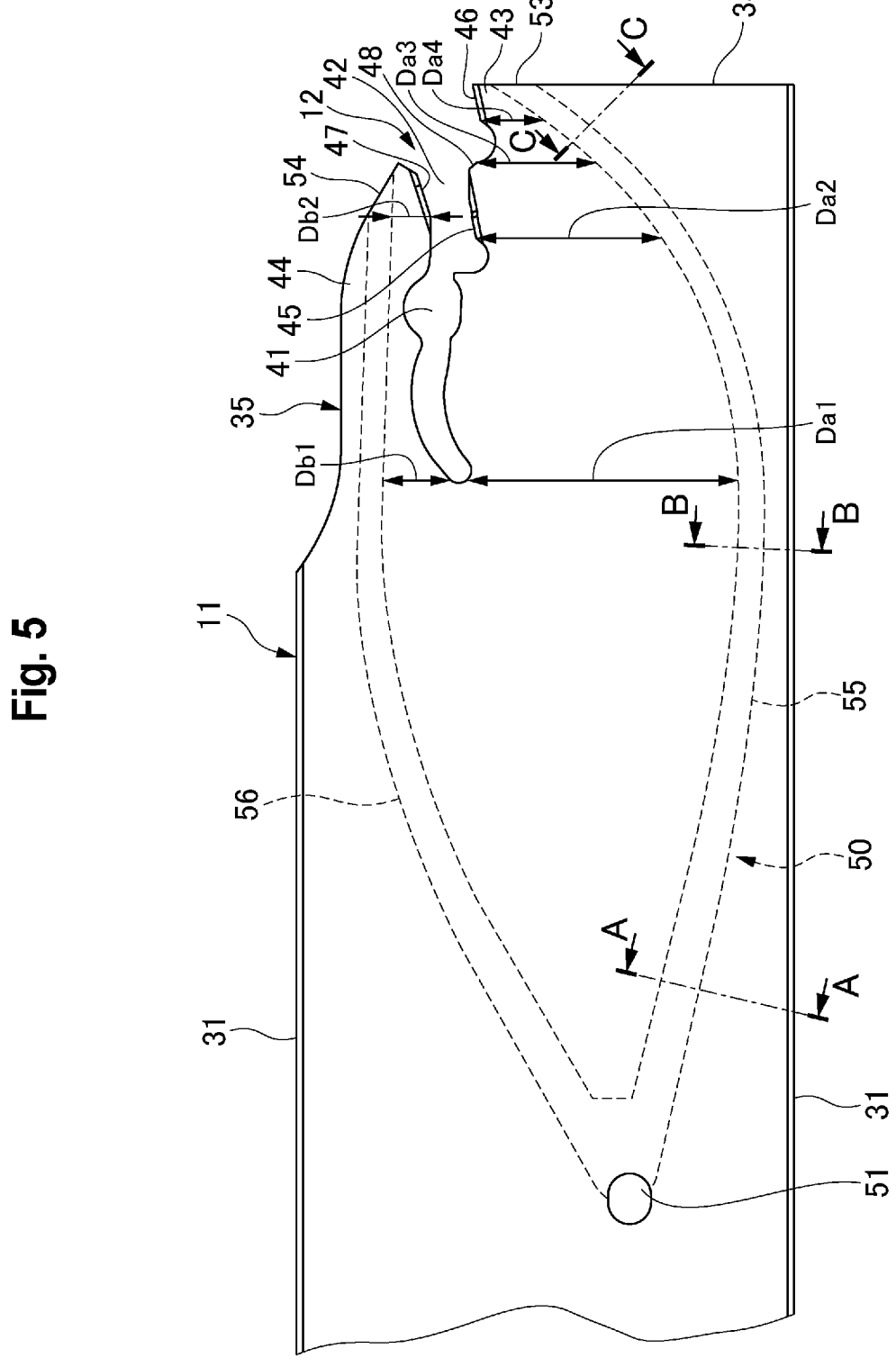
FIG. 5 is a side view of part of the blade body.
Figure 6:
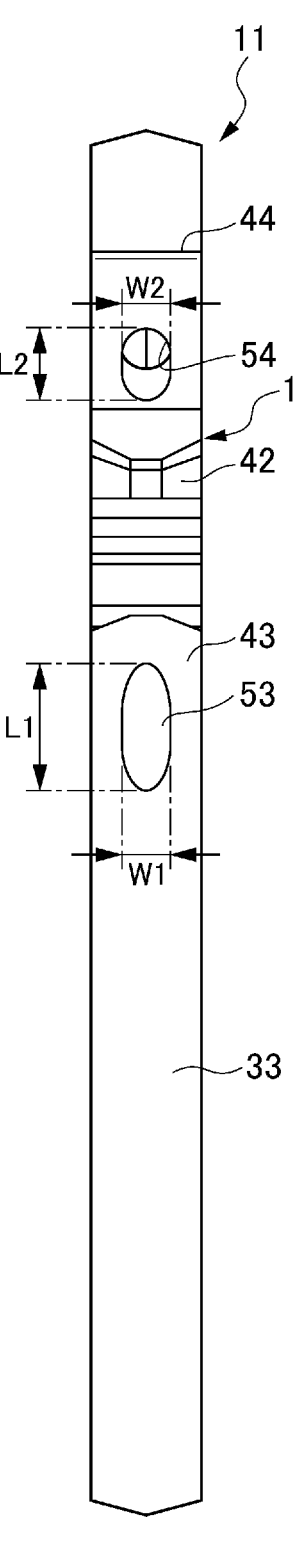
FIG. 6 is a front view of the blade body when viewed from one end part thereof.

FIG. 5 is a side view of part of the blade body. FIG. 6 is a front view of the blade body when viewed from one end part thereof.

As illustrated in FIG. 5, each insert holding portion 35 of the blade body 11 includes a coolant supply portion 50. The coolant supply portion 50 is constituted by a supply inlet 51, a lower discharge port (discharge port) 53, an upper discharge port (discharge port) 54, a lower coolant supply path (coolant supply path) 55, and an upper coolant supply path (coolant supply path) 56. The supply inlet 51 is opened at one side surface of the blade body 11, and coolant is supplied through the supply inlet 51. The coolant is a lubrication material that is supplied mainly for cooling and lubrication to a machining place of a material machined by the cutting insert 13, and is, for example, water-soluble coolant or oil-based coolant.

As illustrated in FIG. 6, the lower discharge port 53 and the upper discharge port 54 are opened at an end face nearby each insert attachment portion 12 of the blade body 11. The lower discharge port 53 is formed at an end face of the blade lower portion 43 of the insert attachment portion 12, and the upper discharge port 54 is formed at an end face of the blade upper portion 44 of the insert attachment portion 12.

The lower coolant supply path 55 is formed in the blade body 11 to connect the supply inlet 51 and the lower discharge port 53. The lower coolant supply path 55 includes a curved path extending on the lower side of the slit 41 of the insert attachment portion 12 and bulging in a direction departing from the slit 41 in a side view of the blade body 11.

The upper coolant supply path 56 is formed in the blade body 11 to connect the supply inlet 51 and the upper discharge port 54. The upper coolant supply path 56 includes a curved path extending on the upper side of the slit 41 of the insert attachment portion 12 and bulging in a direction departing from the slit 41 in a side view of the blade body 11.

In the coolant supply portion 50, the coolant supplied to the supply inlet 51 is discharged from the lower discharge port 53 and the upper discharge port 54 opened at the end face nearby the insert attachment portion 12 through the lower coolant supply path 55 and the upper coolant supply path 56. Accordingly, a machining place of a material machined by the cutting insert 13 attached to the insert attachment portion 12 is cooled and lubricated with the coolant.

Figure 7A:
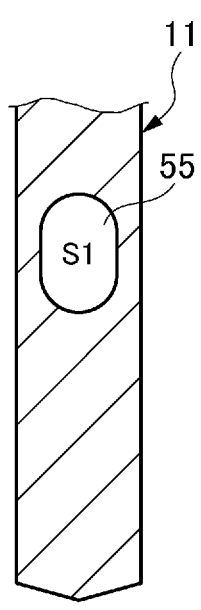
FIG. 7A is a cross-sectional view along line A-A in FIG. 5.
Figure 7B:
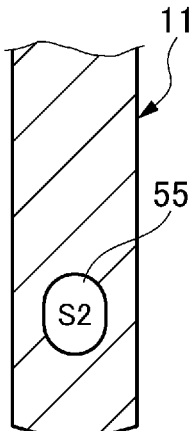
FIG. 7B is a cross-sectional view along line B-B in FIG. 5.
Figure 7C:
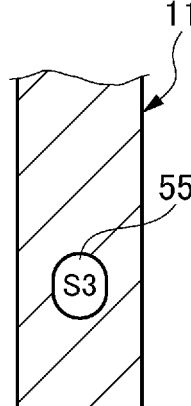
FIG. 7C is a cross-sectional view along line C-C in FIG. 5.

FIGS. 7A to 7C are diagrams illustrating change of the cross-sectional area of the lower coolant supply path 55.

As compared to cross-sectional area S1 of the lower coolant supply path 55 on the supply inlet 51 side as illustrated in FIG. 7A, cross-sectional area S2 thereof at the middle position between the supply inlet 51 and the lower discharge port 53 as illustrated in FIG. 7B is small, and cross-sectional area S3 thereof on the lower discharge port 53 side as illustrated in FIG. 7C is further small.

In this manner, the cross-sectional area of the lower coolant supply path 55 gradually decreases from the supply inlet 51 toward the lower discharge port 53. Similarly, the cross-sectional area of the upper coolant supply path 56 gradually decreases from the supply inlet 51 toward the upper discharge port 54.

Since the cross-sectional areas of the lower coolant supply path 55 and the upper coolant supply path 56 gradually decrease from the supply inlet 51 toward the lower discharge port 53 and the upper discharge port 54, the flow speed of the coolant flowing through the lower coolant supply path 55 and the upper coolant supply path 56 is increased from the supply inlet 51 toward the lower discharge port 53 and the upper discharge port 54. Accordingly, it is possible to more efficiently supply the coolant to a machining place and efficiently cool and lubricate the machining place, thereby contributing to reduction of abrasion of the blade tip 14 of the cutting insert 13.

In a direction orthogonal to the long sides of the blade body 11 (also interpreted as a direction parallel to the short sides of the blade body 11; this is the same in the following description), the lower coolant supply path 55 is positioned at a distance Da1 to a rear end part of the slit 41, a distance Da2 to the insert lower support surface 45, a distance Da3 to the insert longitudinal support surface 48, and a distance Da4 to the insert lower support surface 46. The distance Da1 from the lower coolant supply path 55 to the rear end part of the slit 41 is longer than the distance Da2 to the insert lower support surface 45, the distance Da3 to the insert longitudinal support surface 48, and the distance Da4 to the insert lower support surface 46.

The upper coolant supply path 56 is positioned at a distance Db1 to the rear end part of the slit 41 and a distance Db2 to the insert upper support surface 47 in the direction orthogonal to the long sides of the blade body 11. The distance Db1 from the upper coolant supply path 56 to the rear end part of the slit 41 is longer than the distance Db2 to the insert upper support surface 47.

Accordingly, the second moment of area between the slit 41 and each of the lower coolant supply path 55 and the upper coolant supply path 56 in the blade body 11 can be increased. Thus, plastic deformation around the slit 41 is reduced, which leads to lifetime extension.

The sectional shapes of the lower coolant supply path 55 and the upper coolant supply path 56 on the lower discharge port 53 side and the upper discharge port 54 side are elliptical shapes that are long in the plane direction of the blade body 11 (refer to FIG. 6). Accordingly, the lower coolant supply path 55 has a length size L1 larger than a width size W1 on the lower discharge port 53 side, and the upper coolant supply path 56 has a length size L2 larger than a width size W2 on the upper discharge port 54 side.

Thus, even when the thickness of the blade body 11 is small, it is possible to ensure sufficient cross-sectional area of the lower coolant supply path 55 on the lower discharge port 53 side and sufficient cross-sectional area of the upper coolant supply path 56 on the upper discharge port 54 side and smoothly discharge the coolant from the lower discharge port 53 and the upper discharge port 54, thereby reducing scattering of the coolant. The sectional shapes of the lower coolant supply path 55 and the upper coolant supply path 56 on the lower discharge port 53 side and the upper discharge port 54 side are not limited to elliptical shapes but may be long hole shapes.

The aspect ratio (L1/W1) of the lower coolant supply path 55 on the lower discharge port 53 side is smaller than that on the supply inlet 51 side. Similarly, the aspect ratio (L2/W2) of the upper coolant supply path 56 on the upper discharge port 54 side is smaller than that on the supply inlet 51 side. Accordingly, the flow speed of the coolant discharged from the lower discharge port 53 and the upper discharge port 54 is increased.

Figure 8:
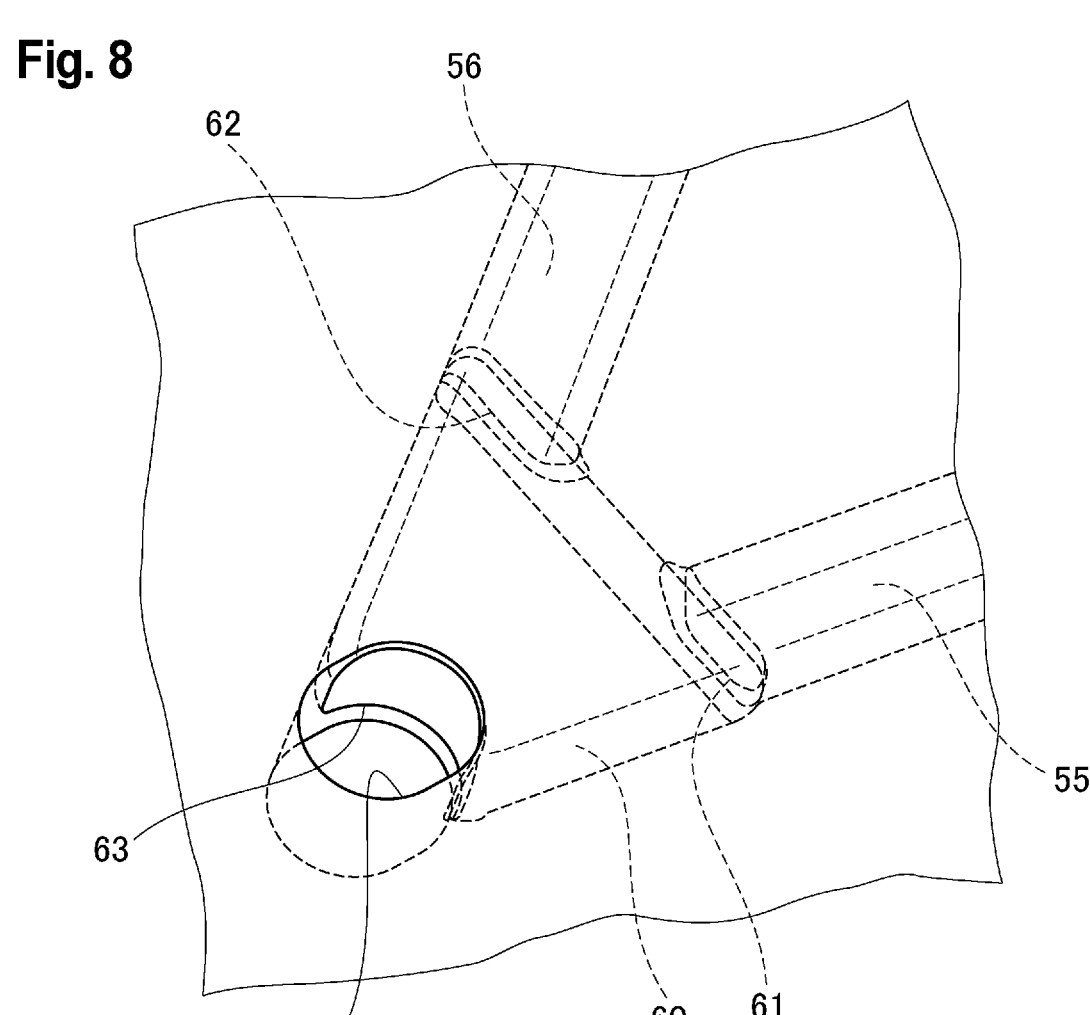
FIG. 8 is a perspective view around a supply inlet of the blade body.

FIG. 8 is a perspective view around each supply inlet of the blade body.

As illustrated in FIG. 8, the blade body 11 includes a chamber 60 at a bifurcation place where the lower coolant supply path 55 and the upper coolant supply path 56 are bifurcated from the supply inlet 51. The chamber 60 accumulates the coolant supplied to the supply inlet 51.

Since the chamber 60 is provided at the bifurcation place where the lower coolant supply path 55 and the upper coolant supply path 56 are bifurcated from the supply inlet 51, the flow speed of the coolant is decreased before the coolant is fed to the lower coolant supply path 55 and the upper coolant supply path 56.

Figure 9:
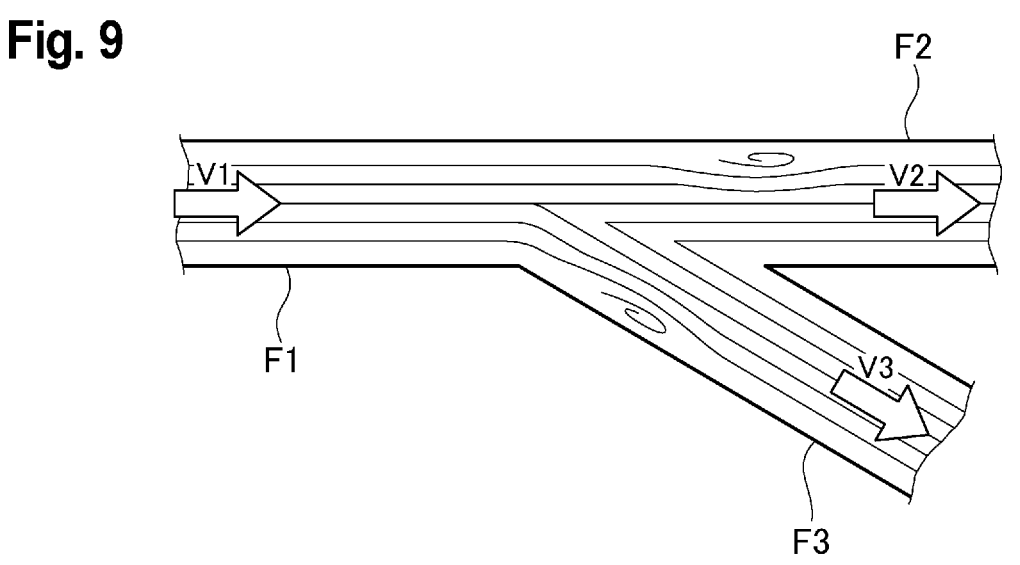
FIG. 9 is a schematic diagram of flow paths for description of a bifurcation loss.
Figure 10:
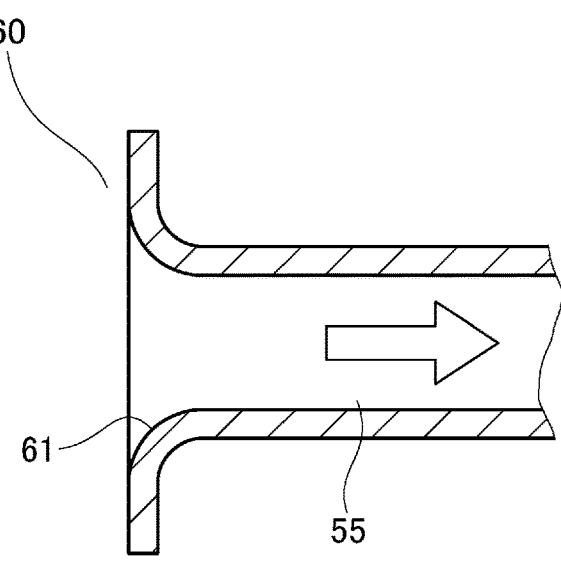
FIG. 10 is a schematic sectional view of a place where a chamber including a fillet portion is connected to a lower coolant supply path.
Figure 11:
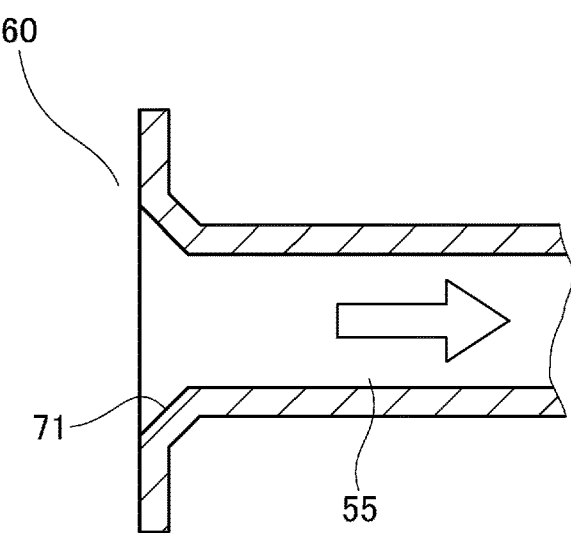
FIG. 11 is a schematic sectional view of a place where a chamfered chamber is connected to the lower coolant supply path.
Figure 12:
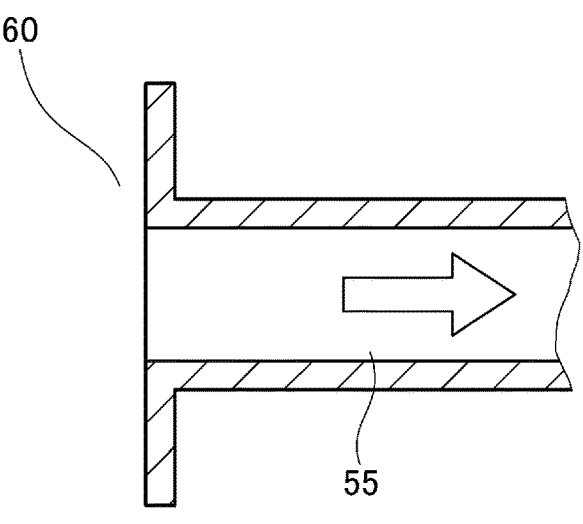
FIG. 12 is a schematic sectional view of a place where a chamber with right-angled corners is connected to the lower coolant supply path.

FIG. 9 is a schematic diagram of flow paths for description of a bifurcation loss. FIG. 10 is a schematic sectional view of a place where a chamber including a fillet portion is connected to the lower coolant supply path. FIG. 11 is a schematic sectional view of a place where a chamfered chamber is connected to the lower coolant supply path. FIG. 12 is a schematic sectional view of a place where a chamber with right-angled corners is connected to the lower coolant supply path.

As illustrated in FIG. 9, in a case in which fluid at a flow speed V1 in a flow path F1 is bifurcated and fed at flow speeds V2 and V3 to flow paths F2 and F3, respectively, a bifurcation loss ΔPsb2 when the fluid flows from the flow path F1 to the flow path F2 and a bifurcation loss ΔPsb3 when the fluid flows from the flow path F1 to the flow path F3 are expressed by Expressions (1) and (2) below.

$$\Delta Psb2 = \zeta b2 \ (\rho \cdot V1^2/2) \tag{1}$$

$$\Delta Psb3 = \zeta b3 \ (\rho \cdot V1^2/2) \tag{2}$$

where
$\zeta b2$: loss coefficient
$\zeta b3$: loss coefficient
$\rho$: density

As in Expressions (1) and (2) above, the bifurcation loss when the fluid is bifurcated from the flow path F1 to the flow paths F2 and F3 is largely affected by the flow speed V1 of the fluid before the bifurcation.

In the blade 100 according to the present embodiment, since the chamber 60 is provided at the bifurcation place where the lower coolant supply path 55 and the upper coolant supply path 56 are bifurcated from the supply inlet 51 as described above, the flow speed of the coolant is decreased before the coolant is fed to the lower coolant supply path 55 and the upper coolant supply path 56. Accordingly, the bifurcation losses of the coolant when fed to the lower coolant supply path 55 and the upper coolant supply path 56 are reduced.

As illustrated in FIG. 8, a fillet portion 61 is formed at a place where the chamber 60 is connected to the lower coolant supply path 55. As illustrated in FIG. 10, the fillet portion 61 is formed at an edge part of a connection end of the lower coolant supply path 55 to the chamber 60 and has a circular arc shape in a sectional view. Accordingly, an entrance loss of the coolant when flowing from the chamber 60 into the lower coolant supply path 55 is reduced as compared to a case in which a chamfer 71 that is straight in the sectional view is formed at the edge part of the connection end of the lower coolant supply path 55 to the chamber 60 as illustrated in FIG. 11 and a case in which the edge part of the connection end of the lower coolant supply path 55 to the chamber 60 is right-angled in the sectional view as illustrated in FIG. 12.

Similarly, a fillet portion 62 having a circular arc shape in a sectional view is formed at a place where the chamber 60 is connected to the upper coolant supply path 56 (refer to FIG. 8). Accordingly, an entrance loss of the coolant when flowing from the chamber 60 into the upper coolant supply path 56 is reduced.

In addition, a fillet portion 63 having a circular arc shape in a sectional view is formed at a place where the supply inlet 51 is connected to the chamber 60 (refer to FIG. 8). Accordingly, an entrance loss of the coolant when flowing from the supply inlet 51 into the chamber 60 is reduced.

As described above, in the blade 100 according to the present embodiment, the coolant supplied through the supply inlet 51 can be discharged from the lower discharge port 53 and the upper discharge port 54 opened at the end face nearby the insert attachment portion 12 through the lower coolant supply path 55 and the upper coolant supply path 56. Accordingly, a machining place of a material machined by the cutting insert 13 attached to the insert attachment portion 12 can be cooled and lubricated with the coolant.

Figure 13:
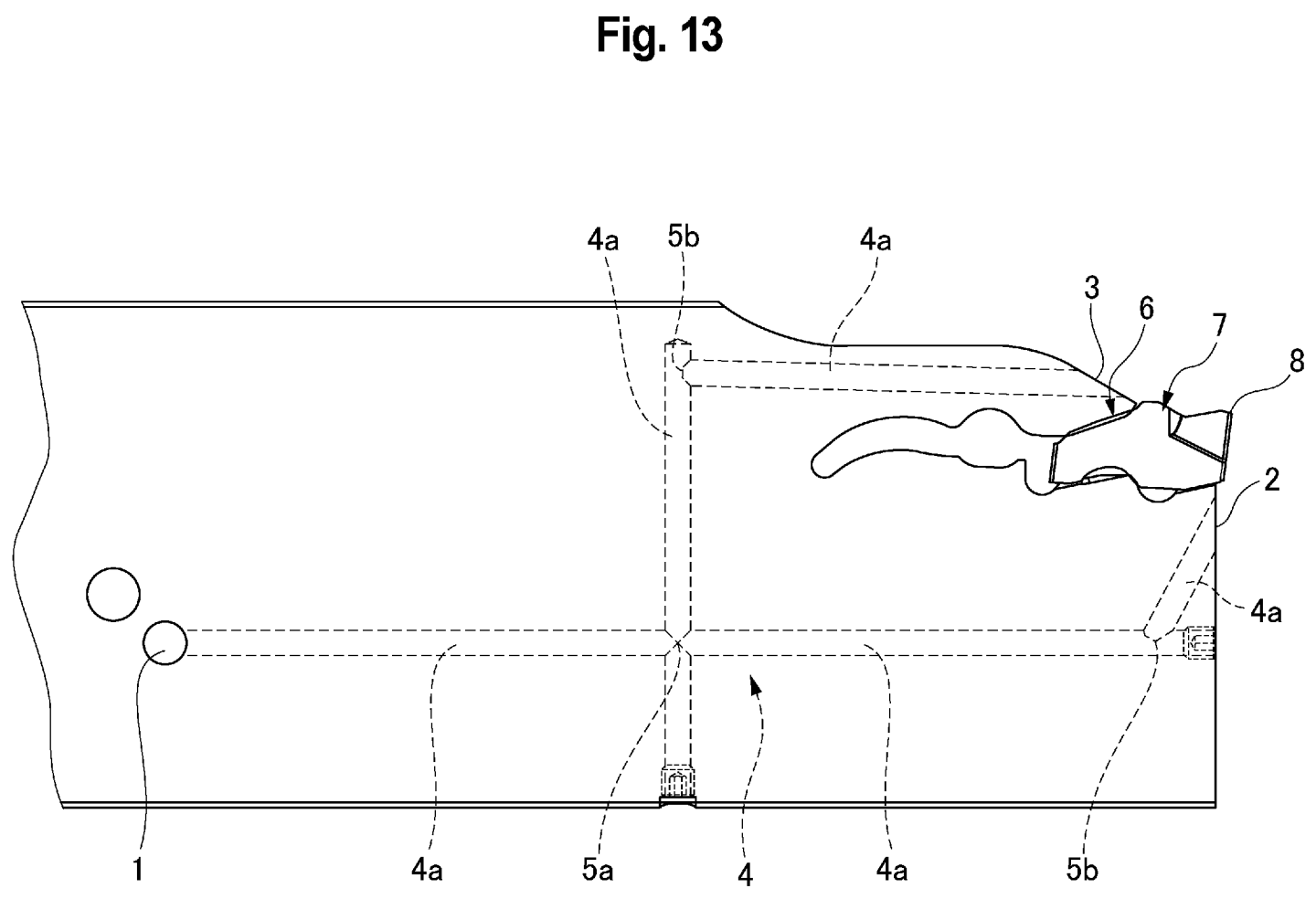

Moreover, since the lower coolant supply path 55 and the upper coolant supply path 56 through which the coolant is guided to the lower discharge port 53 and the upper discharge port 54 each have a curved shape, as illustrated in FIG. 13, a pressure loss of the flowing coolant is reduced as compared to a case of a coolant supply path 4 constituted by straight flow paths 4*a* bifurcated from a supply inlet 1 and connected to a plurality of discharge ports 2 and 3. Accordingly, it is possible to efficiently supply the coolant to a machining place and efficiently cool and lubricate the machining place.

REFERENCE SIGNS LIST

11 blade body
12 insert attachment portion
13 cutting insert
41 slit
45, 46 insert lower support surface (support surface)
47 insert upper support surface (support surface)
48 insert longitudinal support surface (support surface)
51 supply inlet
53 lower discharge port (discharge port)
54 upper discharge port (discharge port)
55 lower coolant supply path (coolant supply path)
56 upper coolant supply path (coolant supply path)
60 chamber
61, 62, 63 fillet portion
100 blade

What is claimed is:

1. A blade in which a cutting insert is attached to an insert attachment portion provided at a longitudinal end part of a blade body formed in a long plate shape, wherein the blade body includes a supply inlet opened at one side surface, a plurality of discharge ports opened at an end face nearby the insert attachment portion, and a plurality of coolant supply paths connecting the supply inlet to the plurality of discharge ports, and the coolant supply paths each have a curved shape in a side view, wherein the coolant supply paths each have a cross-sectional area that gradually decreases from the supply inlet toward a corresponding one of the discharge ports.

2. The blade according to claim 1, wherein the insert attachment portion is made of a slit having a plurality of support surfaces that sandwich and support the cutting insert to be fitted, and a distance from each of the coolant supply paths to a rear end part of the slit in a direction orthogonal to long sides of the blade body is longer than a distance from the coolant supply path to a corresponding one of the support surfaces.

3. The blade according to claim 1, wherein a sectional shape of each of the coolant supply paths on a side closer to a corresponding one of the discharge ports is an elliptical shape or long hole shape that is long in a plane direction of the blade body, and a cross-sectional area of the coolant supply path on the side closer to the discharge port is smaller than a cross-sectional area of the coolant supply path on a side closer to the supply inlet.

4. The blade according to claim 1, wherein the blade body includes a chamber in which coolant supplied to the supply inlet is accumulated at a bifurcation place where the plurality of coolant supply paths are bifurcated from the supply inlet.

5. A blade in which a cutting insert is attached to an insert attachment portion provided at a longitudinal end part of a blade body formed in a long plate shape, wherein the blade body includes a supply inlet opened at one side surface, a plurality of discharge ports opened at an end face nearby the insert attachment portion, and a plurality of coolant supply paths connecting the supply inlet to the plurality of discharge ports, and the coolant supply paths each have a curved shape in a side view, wherein the blade body includes a chamber in which coolant supplied to the supply inlet is accumulated at a bifurcation place where the plurality of coolant supply paths are bifurcated from the supply inlet, and a fillet portion having a circular arc shape in a sectional view is formed at a place where the chamber is connected to the coolant supply paths.

6. The blade according to claim 5, wherein the insert attachment portion is made of a slit having a plurality of support surfaces that sandwich and support the cutting insert to be fitted, and a distance from each of the coolant supply paths to a rear end part of the slit in a direction orthogonal to long sides of the blade body is longer than a distance from the coolant supply path to a corresponding one of the support surfaces.

7. The blade according to claim 5, wherein a sectional shape of each of the coolant supply paths on a side closer to a corresponding one of the discharge ports is an elliptical shape or long hole shape that is long in a plane direction of the blade body, and a cross-sectional area of the coolant supply path on the side closer to the discharge port is smaller than a cross-sectional area of the coolant supply path on a side closer to the supply inlet.

* * * * *